United States Patent
Keslin et al.

(10) Patent No.: US 10,713,434 B2
(45) Date of Patent: Jul. 14, 2020

(54) TRANSFER OF CONTENT BETWEEN DOCUMENTS OF DIFFERENT STORAGE TYPES

(71) Applicant: MICROSOFT TECHNOLOGY LICENSING, LLC, Redmond, WA (US)

(72) Inventors: Michelle Keslin, Kirkland, WA (US); Daniel Snyder, Redmond, WA (US); Ali Taleghani, Redmond, WA (US); Nupur Agarwal, Redmond, WA (US); Jitesh Sachdeva, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/856,168

(22) Filed: Dec. 28, 2017

(65) Prior Publication Data

US 2018/0121402 A1  May 3, 2018

Related U.S. Application Data

(62) Division of application No. 14/844,878, filed on Sep. 3, 2015, now Pat. No. 9,953,018.

(60) Provisional application No. 62/155,687, filed on May 1, 2015.

(51) Int. Cl.
| | | |
|---|---|---|
| *G06F 17/00* | (2019.01) | |
| *G06F 40/197* | (2020.01) | |
| *G06F 16/176* | (2019.01) | |
| *G06F 16/178* | (2019.01) | |
| *G06Q 10/10* | (2012.01) | |
| *G06F 40/166* | (2020.01) | |

(52) U.S. Cl.
CPC .......... *G06F 40/197* (2020.01); *G06F 16/176* (2019.01); *G06F 16/178* (2019.01); *G06F 40/166* (2020.01); *G06Q 10/101* (2013.01)

(58) Field of Classification Search
CPC ...................................................... G06F 17/24
See application file for complete search history.

(56) References Cited

U.S. PATENT DOCUMENTS

| | | | |
|---|---|---|---|
| 5,802,380 A * | 9/1998 | Bangs | G06F 17/24 |
| | | | 715/235 |
| 6,745,176 B2 | 6/2004 | Probert, Jr. et al. | |
| 7,028,306 B2 | 4/2006 | Boloker et al. | |
| 7,904,418 B2 | 3/2011 | Agrawal et al. | |

(Continued)

FOREIGN PATENT DOCUMENTS

EP  0898756 A1  3/1999

OTHER PUBLICATIONS

Brush et al., "Robust Annotation Positioning in Digital Documents" SIGCHI'01, Mar. 31-Apr. 4, 2001, Seattle, WA, USA, Copyright 2001 ACM, p. 285-292. (Year: 2001).*

(Continued)

*Primary Examiner* — Amelia L Tapp
(74) *Attorney, Agent, or Firm* — Rainier Patents, P.S.

(57) ABSTRACT

Transfer of content between documents of different storage types is provided. Different versions of an endpoint (e.g., a productivity application) such as a mobile version and a desktop version, for example, may be enabled to process the same document and synchronize changes to the document content, even though the different versions or endpoints may use distinct formats for the same document.

20 Claims, 7 Drawing Sheets

(56) References Cited

U.S. PATENT DOCUMENTS

| | | | |
|---|---|---|---|
| 7,974,832 B2 | 7/2011 | Furuuchi et al. | |
| 8,407,290 B2 | 3/2013 | Abt et al. | |
| 8,819,123 B1 | 8/2014 | Veen | |
| 8,938,505 B2 | 1/2015 | Nivala et al. | |
| 9,069,767 B1* | 6/2015 | Hamaker | G06F 16/93 |
| 9,916,295 B1* | 3/2018 | Crawford | G06F 17/24 |
| 2004/0015537 A1* | 1/2004 | Doerksen | H04L 29/06 |
| | | | 709/203 |
| 2006/0171523 A1* | 8/2006 | Greenwell | H04W 4/00 |
| | | | 379/242 |
| 2009/0249224 A1 | 10/2009 | Davis et al. | |
| 2010/0257457 A1 | 10/2010 | Goes | |
| 2011/0010616 A1 | 1/2011 | Wang | |
| 2012/0101980 A1 | 4/2012 | Taleghani et al. | |
| 2012/0110443 A1 | 5/2012 | Lemonik et al. | |
| 2012/0192055 A1 | 7/2012 | Antebi et al. | |
| 2012/0192064 A1 | 7/2012 | Antebi et al. | |
| 2012/0297377 A1 | 11/2012 | Chen et al. | |
| 2013/0205203 A1 | 8/2013 | MacDougall et al. | |
| 2013/0283147 A1 | 10/2013 | Wong et al. | |
| 2014/0143680 A1 | 5/2014 | Angarita et al. | |
| 2014/0215302 A1 | 7/2014 | Little et al. | |
| 2014/0281872 A1 | 9/2014 | Glover | |

OTHER PUBLICATIONS

"International Preliminary Report on Patentability Issued in PCT Application No. PCT/US2016/029903", dated Jul. 14, 2017, 8 Pages.

"Second Written Opinion Issued in PCT Application No. PCT/US2016/029903", dated Mar. 16, 2017, 7 Pages.

Mendoza, et al., "A Flexible Distribution Service for a Co-Authoring Environment on the Web", In Proceedings of Sixth Mexican International Conference on Computer Science, Sep. 26, 2005, 8 pages.

Wu, et al., "A Partial Persistent Data Structure to Support Consistency in Real-Time Collaborative Editing", In Proceedings of 26th IEEE International Conference on Data Engineering, Mar. 1, 2010, 4 pages.

Tandler, Peter, "Software Infrastructure for Ubiquitous Computing Environments: Supporting Synchronous Collaboration with Heterogeneous Devices", In Proceedings of the 3rd International Conference on Ubiquitous Computing, Sep. 30, 2001, pp. 96-115.

"International Search Report and Written Opinion Issued in PCT Application No. PCT/US2016/029903", dated Aug. 9, 2016, 11 Pages.

* cited by examiner

TRANSFER OF CONTENT BETWEEN DOCUMENTS OF DIFFERENT STORAGE TYPES

CROSS-REFERENCE TO RELATED APPLICATIONS

This Application is a Divisional under 35 U.S.C. § 120 of U.S. application Ser. No. 14/844,878 filed on Sep. 3, 2015, which claims the benefit under 35 U.S.C. § 119(e) of U.S. Provisional Patent Application Ser. No. 62/155,687 filed on May 1, 2015. The disclosures of the above listed Patent Applications are hereby incorporated by reference in their entirety.

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications present documents. Collaboration applications may present documents for co-authoring. Complex schemes may demand synchronized documents in co-authoring environments

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to transfer of content between documents of different storage types. In some examples, exchange of documents processed by a plurality of endpoints associated with a productivity service may be facilitated. Display of a first version of a document stored in a first file type through a first endpoint and a second version of the document stored in a second file type through a second endpoint may be enabled, where the first and the second endpoints are different versions of a productivity application within the productivity service executed on distinct computing devices. Upon detecting a first operation applied to a first paragraph within the first version of the document, a first Character count of an offset between a start of the first paragraph and a first position of the first operation may be computed. Then, the first operation, an identifier of the first paragraph, and the first character count may be transmitted to the second endpoint to prompt the second endpoint to apply the first operation to a second position in a second paragraph of the second version of the document, where the second position and the second paragraph correspond to the first position and the first paragraph in the first version of the document.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
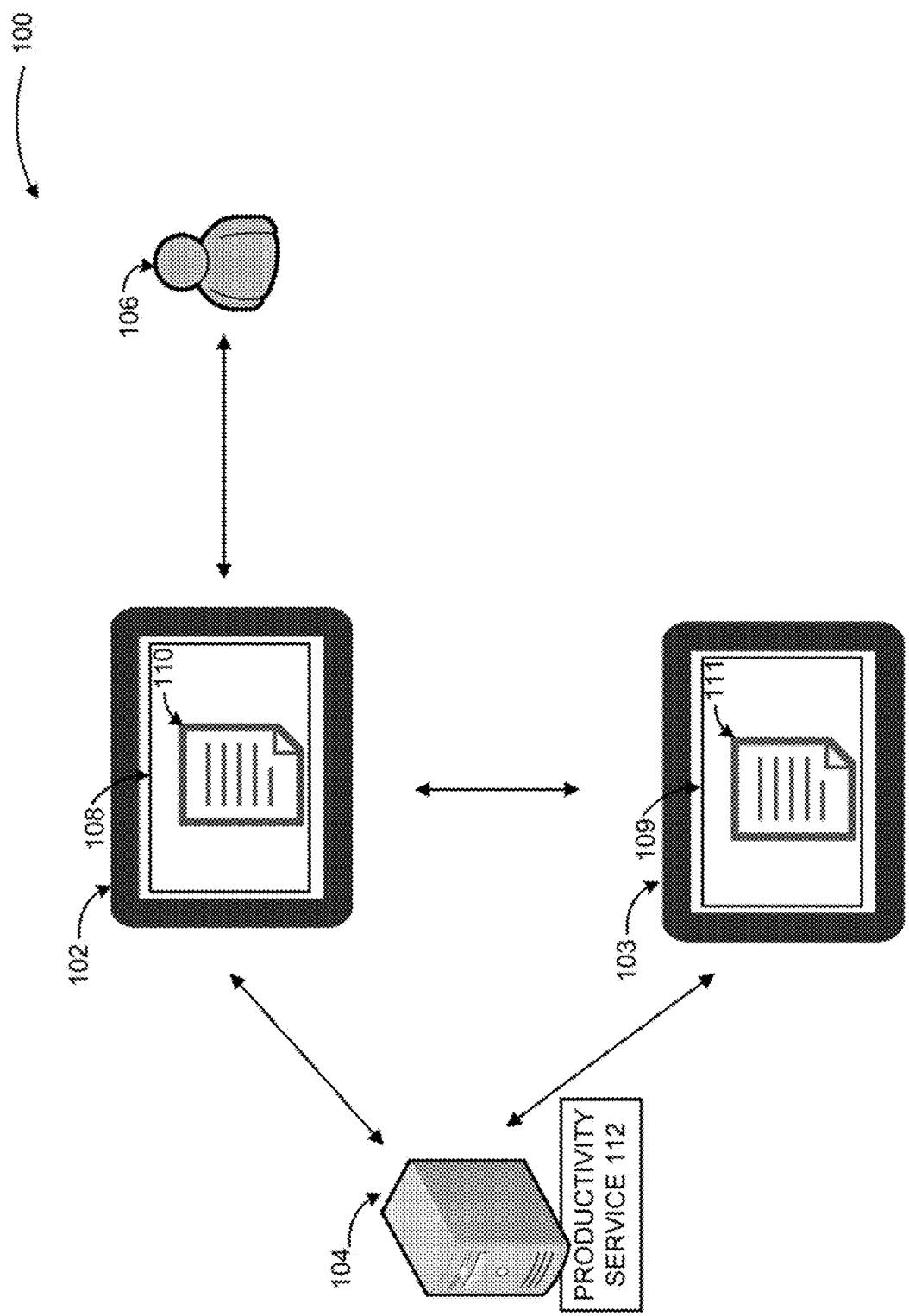
FIG. 1 is a conceptual diagram illustrating an example system for providing transfer of content between documents of different storage types, according to embodiments.

As briefly described above, transfer of content between documents of different storage types may be provided by a productivity service. Different versions of an endpoint (e.g., a productivity application) such as a mobile version and a desktop version, for example, may be enabled to process the same document and synchronize changes to the document content even though the different versions or endpoints may use distinct formats for the same document.

For example, an execution of an initial operation may be detected on the document. The initial operation may include a cursor placement operation, an insertion operation, an editing operation, or a deletion operation, among others. An initial operation, a paragraph identifier, and a character count (e.g., from a start of a paragraph to a position of the initial operation) may be determined and transmitted from one endpoint to another endpoint processing the same document, to prompt the other endpoint to apply the initial operation onto the document at the other endpoint, allowing synchronization of changes between two collaborators using the endpoints.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a Compact disk, and comparable hardware media.

Throughout this specification, the term "platform" may be a combination of software and hardware components to provide transfer of content between documents of different storage types. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes touch input, gesture input, voice command, eye tracking, gyroscopic input, pen input, mouse input, or keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of providing transfer of content between documents of different storage types, according to embodiments.

In a diagram 100, a computing device 102 may execute an endpoint 108 (or a productivity application). The computing device 102 may include a tablet device, a laptop computer, a desktop computer, and a smart phone, among others. The computing device 102 may display a first version 110 of a document through a user interface of the endpoint 108 to a user 106. The user 106 may be allowed to interact with the endpoint 108 through an input device or touch enabled display component of the computing device 102. The computing device 102 may include a display device such as the touch enabled display component, and a monitor, among others to provide the endpoint 108 to the user 106.

Computing device 103 may execute the endpoint 109 (or productivity application). The endpoints 108 and 109 may be different versions of the same productivity application (e.g., word processing application, presentation application, note taking application, spreadsheet application, and comparable ones) executed on distinct computing devices, thus with some differing features or capabilities. For example, the endpoint 108 may be a locally installed mobile version while the endpoint 109 may be a web application provided through a browser on the computing device 103. A first version 110 and a second version 111 of a document (not displayed) may be worked on by two different users or the same user through two different endpoints. Thus, the first version 110 may be saved using a different file format (e.g., container type) compared to the second version 111 due to feature/capability differences between the endpoints. Therefore, changes made in first version 110 may not necessarily be reflected at the exact same location within the content of the second version 111 and vice versa. Embodiments enable translation of positions between two versions of a document of differing file types such that changes made in one can be reflected correctly and accurately in the other.

For example, an execution of an initial operation may be detected on a paragraph of the first version 110 of the document. The initial operation may include a cursor placement operation, an insertion operation, an edit operation, and/or a deletion operation, among others. The paragraph may be identified with a paragraph identifier. A character count of an offset between a start of the paragraph and a position of the initial operation may be counted.

The initial operation, the paragraph identifier, and the character count may be transmitted to the endpoint 109 to prompt the endpoint 109 to apply the initial operation onto another paragraph of the second version 111 of the document. The other paragraph may be identified with another paragraph identifier that matches the paragraph identifier in the first version 110 of the document.

An example of the endpoint 108 may include a desktop or a mobile client application that presents the first version 110 of the document. An example of the endpoint 109 (executed on a computing device 103) may include a web-based application that presents the second version 111 of the document. The first and second versions (110 and 111) may be synchronized to allow for co-authoring of the documents.

The user 106 may interact with the endpoint 108 with a keyboard based input, a mouse based input, a voice based input, a pen based input, and/or a gesture based input, among others. The gesture based input may include one or more touch based actions such as a touch action, a swipe action, and a combination of each, among others.

The endpoint 108 may store the first version 110 locally. Alternatively, the first version 110 of the document may be retrieved from a productivity service hosted by a productivity server 104. The productivity service may perform the actions to synchronize the first and second versions (110 and 111) of the document. The productivity server 104 may include a web server, a document server, among others. The computing device 102 may communicate with the productivity server 104 through a network. The network may provide wired or wireless communications between nodes such as the computing device 102, or the productivity server 104, among others.

While the example system in FIG. 1 has been described with specific components including the computing device 102, the endpoint 108, the computing device 103, the endpoint 109, the productivity service 112, and the productivity server 104, embodiments are not limited to these components or system configurations and can be implemented with other system configuration employing fewer or additional components.

Figure 2:
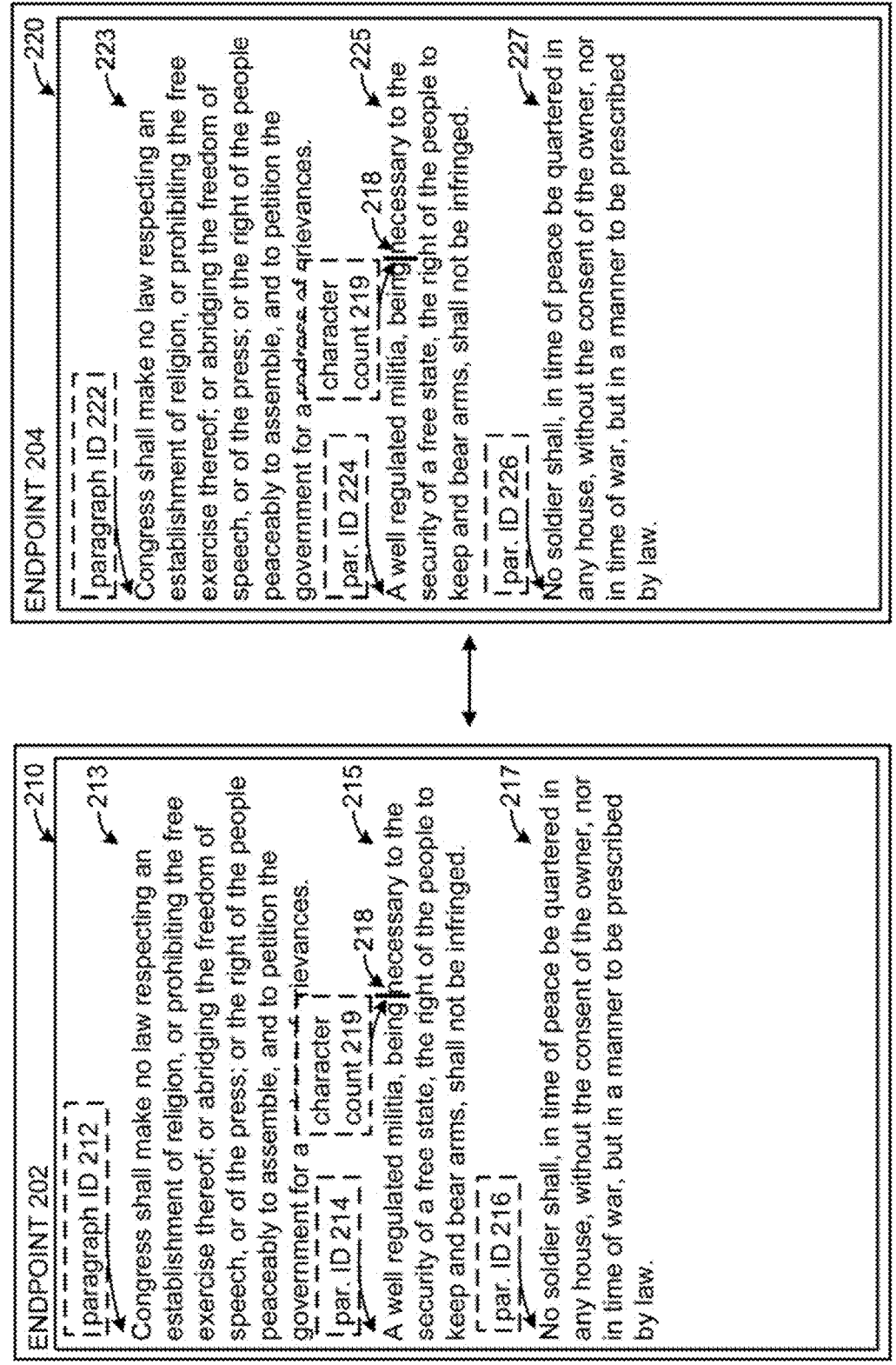
FIG. 2 is a display diagram illustrating an example transfer of content between documents of different storage types, according to embodiments.

FIG. 2 is a display diagram illustrating an example of providing transfer of content between documents of different storage types, according to embodiments.

In a diagram 200, an endpoint 202 (e.g., a productivity application) may display a first version 210 of a document (not shown in figure). The first version 210 may include paragraphs (213, 215, and 217). The paragraphs (213, 215, and 217) may be labeled with paragraph identifiers (212, 214, and 216), respectively.

Another endpoint 204 may display a second version 220 of the document as a synchronized copy of the first version 210 of the document. A maintained synchronization between the first and second versions (210 and 220) may allow co-authoring of the document. The second version 220 may include paragraphs (223, 225, and 227). The paragraphs (223, 225, and 227) may be labeled with paragraph identifiers (222, 224, and 226), respectively.

Although a paragraph is provided as an example of a component of the first version 210 of the document used to maintain synchronization with the second version 220 of the document, other component types of the document may also be used to maintain the synchronization. Example component types may include words, lines, sentences, and/or pages, among others. Identifiers associated with component types of the first and second versions (210 and 220) of the document may also be used to synchronize changes between the first and second versions (210 and 220).

An operation 218 on a paragraph 215 of the first version 210 may be detected by the endpoint 202. The operation 218 may include a cursor placement operation to place a cursor in a location within the paragraph 215. The cursor may be subsequently used for additional operations on the paragraph 215.

A character count 219 may be determined between a start of the paragraph 215 and a position of the operation 218. The character count 219, the paragraph identifier 214, and the operation 218 may be transmitted to the endpoint 204 to prompt the endpoint 204 to apply the operation 218 to the second version 220 of the document, to maintain synchronization between the first and second versions (210 and 220) of the document.

A paragraph 225 may be identified as having a paragraph identifier 224. A value of the paragraph identifier may match a value of the paragraph identifier 214 of the paragraph 215. Thus, the paragraphs 225 and 215 may be determined to be the same paragraph. An offset of the character count 219 from a start of the paragraph 225 may be used to identify a position to apply the operation 218 to the paragraph 225. The operation 218 may be performed on the identified position in the paragraph 225 to synchronize the first and second versions (210 and 220) of the document.

Figure 3:
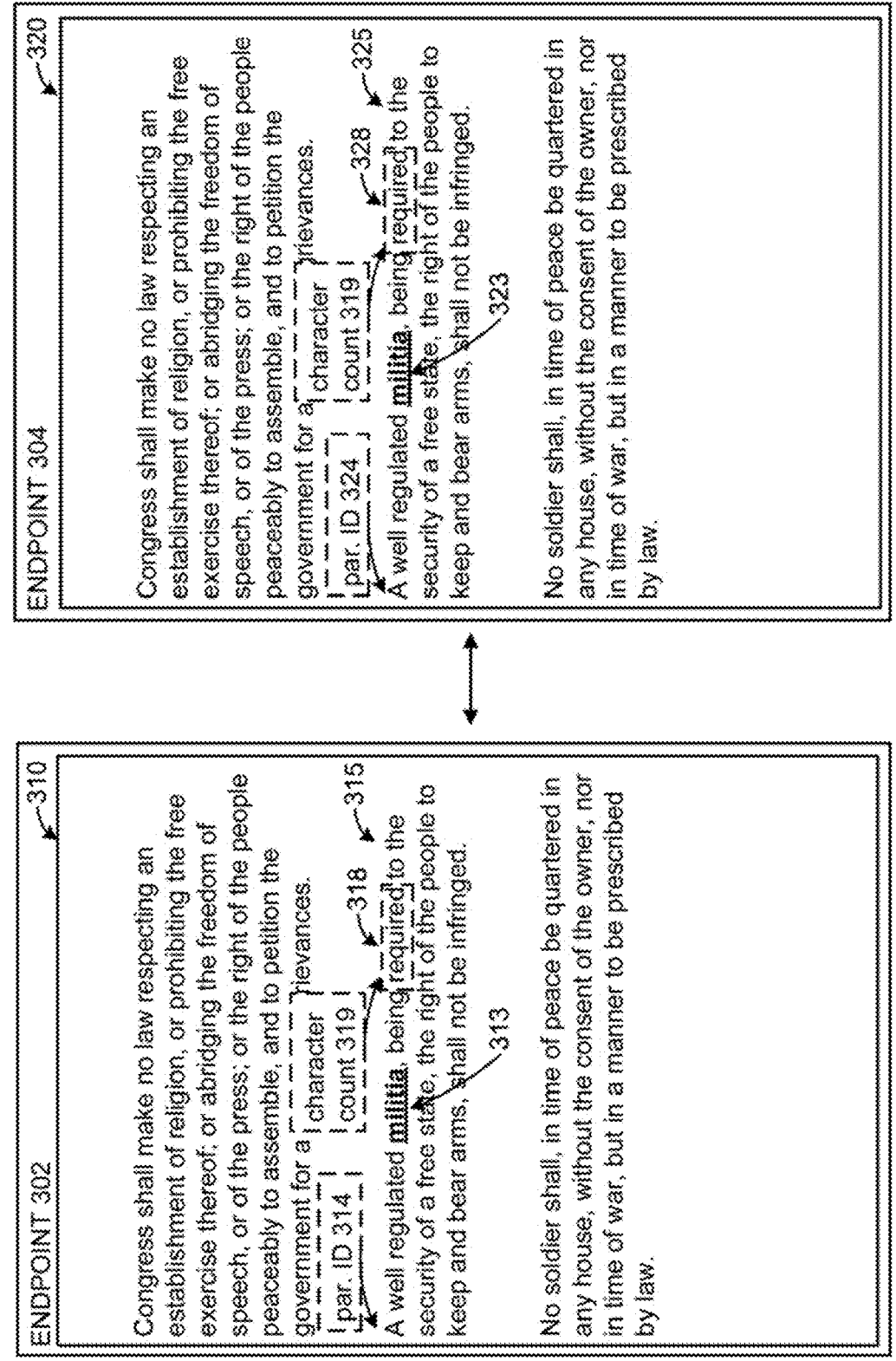
FIG. 3 is a display diagram illustrating another example transfer of content between documents of different storage types, according to embodiments.

FIG. 3 is a display diagram illustrating another example of providing transfer of content between documents of different storage types, according to embodiments.

In a diagram 300, an endpoint 302 (e.g., a productivity application) may display a first version 310 of a document (not shown in figure) that is synchronized with a second version 320 of the document. The second version 320 may be presented by an endpoint 304 (e.g., another productivity application).

In an example scenario, an operation may be detected as applied to a text block 318 of a paragraph 315 within the first version 310. The operation may include an insertion operation, an editing operation, and/or a deletion operation, among similar operations. The text block 318 may include characters, words, and/or sentences, among others.

A character count 319 may be determined to identify a position of the operation. The character count 319 may identify an offset from a start of the paragraph 315 to a start of the text block 318. The character count 319, the operation, and the paragraph identifier 314 may be transmitted to the endpoint 304 to prompt the endpoint 304 to apply the operation to the second version 320 of the document to maintain a synchronization of the first and second versions (310 and 320) of the document.

A paragraph 325 with a paragraph identifier 324 may be matched to the paragraph 315 with the paragraph identifier 314. The operation may be applied to a text block 328 in a position that is offset from a start of the paragraph 325 by the character count 319. As a result, the first and second versions (310 and 320) may be synchronized.

An operation applied to a text block 313 with invisible characters may demand additional computations associated with an offset from a start of the paragraph 315. For example, the text block 313 may include a hyperlink or other element that may have invisible characters such as hidden formatting characters. A position of the operation applied to the text block 313 may be offset with a character count from the start of the paragraph 315 and an invisible character count of the invisible characters of the text block 313.

The character count, the invisible character count, the operation, and the paragraph identifier 314 may be transmitted to the endpoint 304 to prompt the endpoint to apply the operation on a text block 323 with invisible characters. The paragraph identifier 314 may be matched to the paragraph identifier 324 to identify the paragraph 325 that matches the paragraph 315. Subsequently, a position of the operation to be applied to text block 323 may be offset from a start of the paragraph 325 by the character count and the invisible character count. The operation may be performed on the text block 323 to synchronize the paragraph 315 to the paragraph 325.

A formatting style of the text block 313 may also be considered when computing the invisible character count. In response to a detection that the formatting style of the text block 313 varies from the formatting style of the text block 323, the invisible character count may be adjusted based on a variance to position the operation in a correct location in the paragraph 325.

Figure 4:
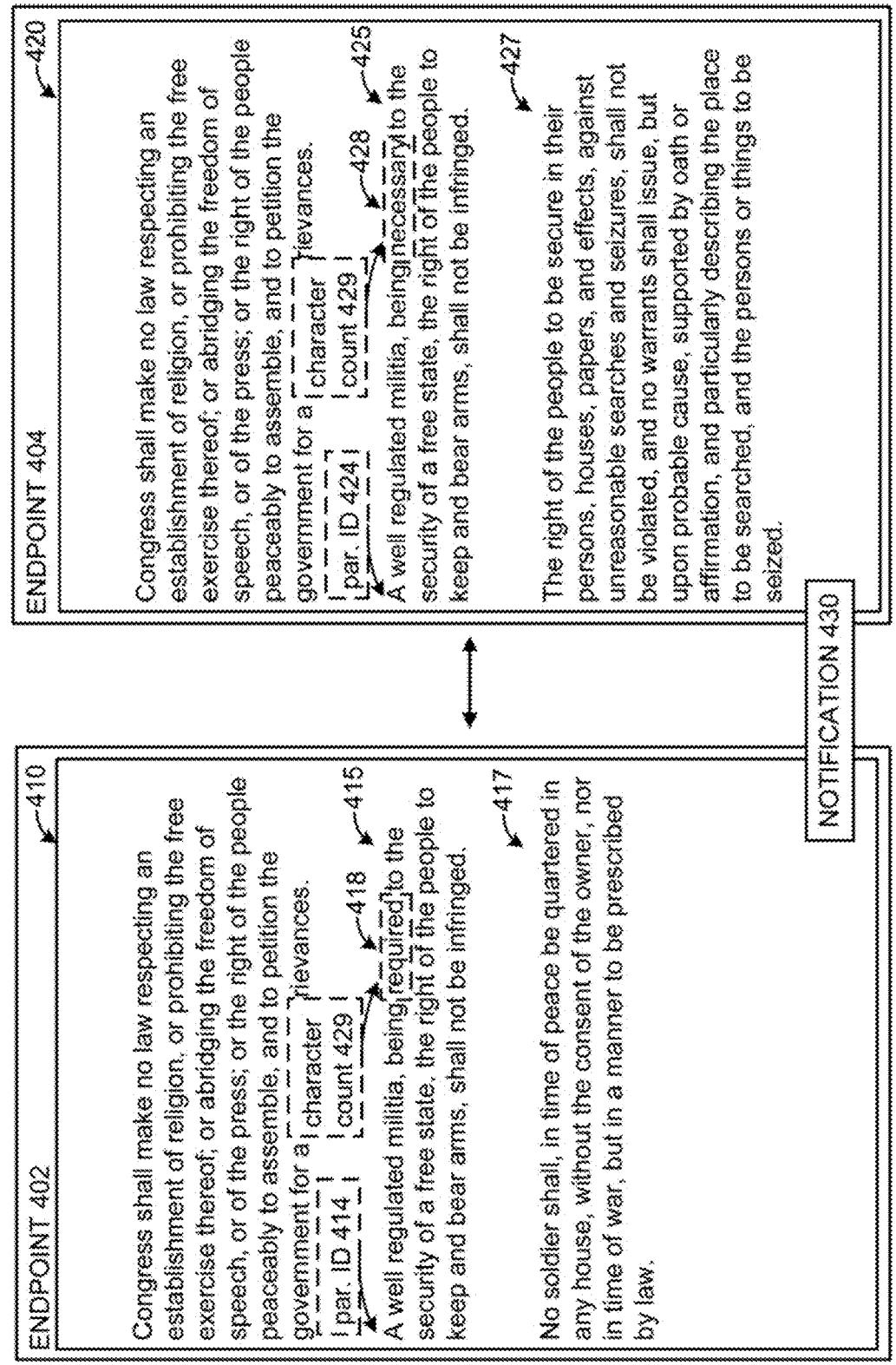
FIG. 4 is a display diagram illustrating an example transfer of content between documents of different storage types, according to embodiments.

FIG. 4 is a display diagram illustrating an example transfer of content between documents of different storage types, according to embodiments.

In a diagram 400, an endpoint 402 may receive a notification 430 from another endpoint 404 that describes out of sync items between first and second versions (410 and 420) of a document (not shown in figure) such as the paragraphs (415 and 425). The endpoint 402 may transmit a request to the other endpoint 404 to transmit the paragraph 425 with a paragraph identifier 424 that matches the paragraph 415 with a paragraph identifier 414.

In response to receiving the paragraph 425, the endpoint 402 may compare the paragraph 425 to the paragraph 415. In response to detecting the out of sync items (418 and 428) between the paragraphs (415 and 425), conflict resolution roles may be performed to synchronize the out of sync items (418 and 428) between the paragraphs (415 and 425). An example conflict resolution rule may cause a replacement of an older item (such as the item 418) in paragraph 415 with a new item (such as the item 428).

To replace the item 418 with the item 428, the character count 429 may be counted from a start of the paragraph 425 to a start of the item 428. The character count 429 of the item 428 and the paragraph identifier 424 may be transmitted to the endpoint 402. The endpoint 402 may replace the item 418 with the item 428 in a position that is offset by the character count 429 from a start of the paragraph 415. As such, the paragraphs (415 and 425) may be synchronized.

Another example conflict resolution rule may cause the paragraph 417 to be replaced by the paragraph 427 in response to an instruction or an identification of the paragraph 427 as a component of the second version 420 (of the document) to be used to overwrite the paragraph 417 of the first version 410 (of the document). Examples of the conflict rules are not provided herein in a limiting sense. Other conflict rules may be performed to resolve conflicts caused by out of sync items between the first and second versions (410, 420) of the document.

As discussed above, the productivity service 112 may be employed to perform operations associated with providing transfer of content between documents of different storage types. An increased user efficiency with the productivity service 112 may occur as a result of matching paragraphs between versions of documents with identifiers and transmitting a character count to identify a placement of an operation to synchronize the versions. Additionally, operations performed by the productivity service 112, such as synchronizing cursor placement and other document operations between documents of different storage types, may reduce processor load, increase processing speed, conserve memory, and reduce network bandwidth usage.

Embodiments, as described herein, address a need that arises from a lack of efficiency between the user 106 interacting with the endpoint 108 of the computing device 102. The actions/operations described herein are not a mere use of a computer, but address results of a system that are direct consequences of software used as a service offered in conjunction with large numbers of users and applications.

The example scenarios and schemas in FIG. 1 through 4 are shown with specific components, data types, and configurations. Embodiments are not limited to systems according to these example configurations. Providing transfer of content between documents of different storage types may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
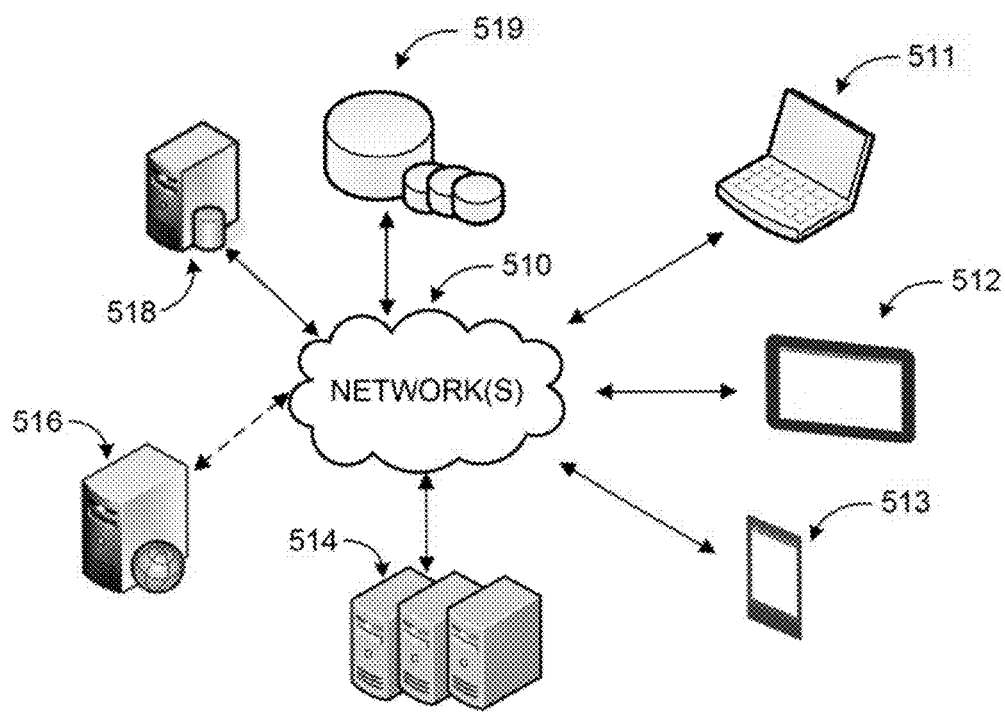
FIG. 5 is a simplified networked environment, where a system according to embodiments may be implemented.

FIG. 5 is an example networked environment, where embodiments may be implemented. An endpoint configured to provide transfer of content between documents of different storage types may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. Different versions (endpoints) of the productivity application may be used on the client devices 511-513 and allow processing of documents even if they are saved using different file types (or container types) as described herein. The endpoint may store data associated with the document in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Figure 6:
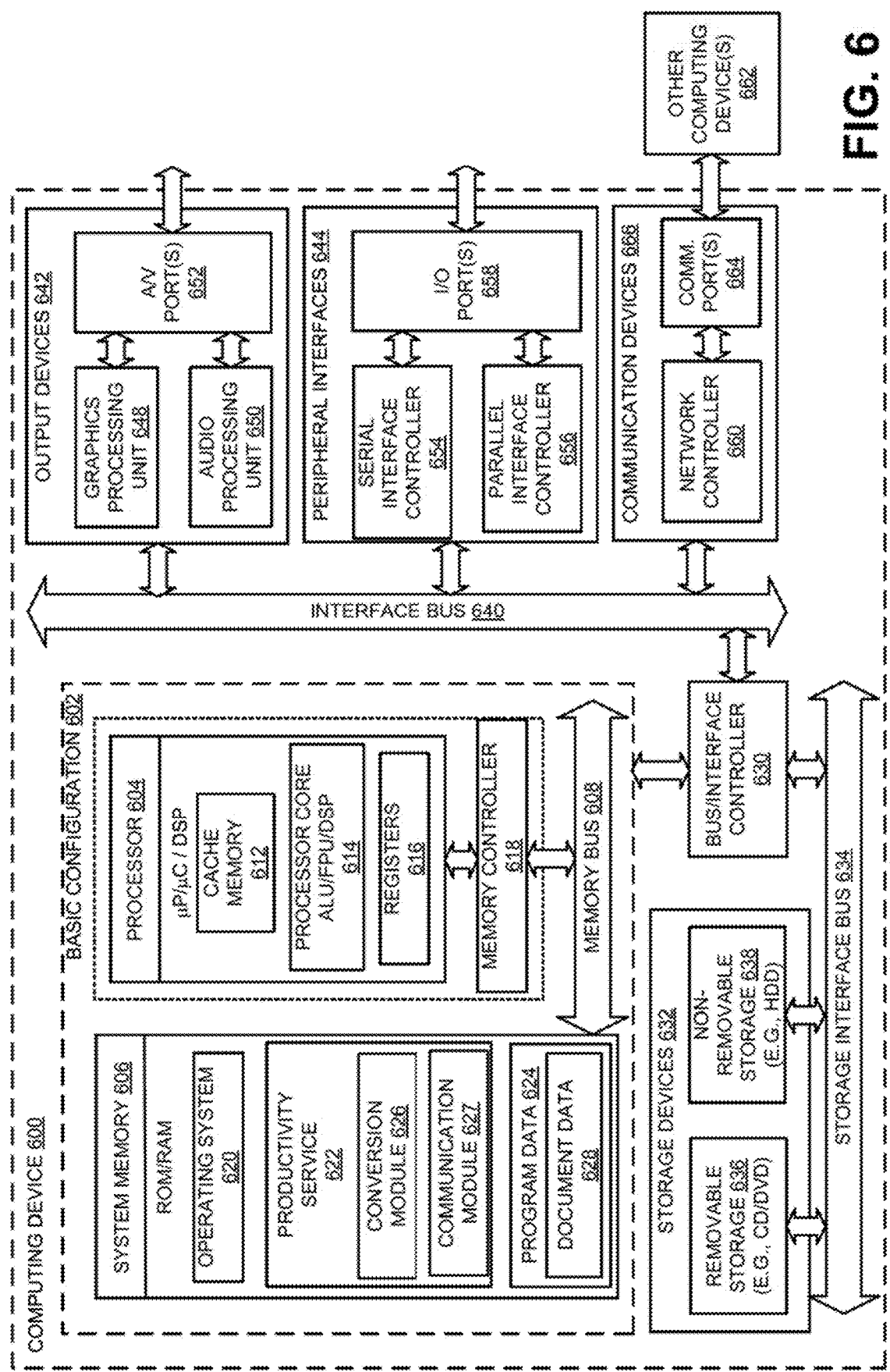
FIG. 6 is a block diagram of an example computing device, which may be used to provide transfer of content between documents of different storage types.

Many other configurations of computing devices, applications, data sources, and data distribution systems may be employed to provide transfer of content between documents of different storage types. Furthermore, the networked environments discussed in FIG. 5 are for illustration purposes only. Embodiments are not limited to the example applications, modules, or processes, FIG. 6 is a block diagram of an example computing device, which may be used to provide transfer of content between documents of different storage types.

For example, computing device 600 may be used as a server, desktop computer, portable computer, smart phone, special purpose computer, or similar device. In an example basic configuration 602, the computing device 600 may include one or inure processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a productivity service 622, and a program data 624. The productivity service 622 may include a component such as a conversion module 626 and a communication module 627. The conversion module 626 and the communication module 627 may execute the processes associated with the productivity service 622. The communication module 627 may facilitate exchange of documents processed by a plurality of endpoints associated with the productivity service. The conversion module 626 may provide translation of position differences within content of documents for operations on the content to be accurately and correctly reflected through the different endpoints.

Components of the productivity service 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the productivity service 622, displayed by the touch based device. The program data 624 may also include, among other data, document data 628, or the like, as described herein. The document data 628 may include a document, an operation, a paragraph identifier, or a character count, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the nota-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By was of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods for providing transfer of content between documents of different storage types. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
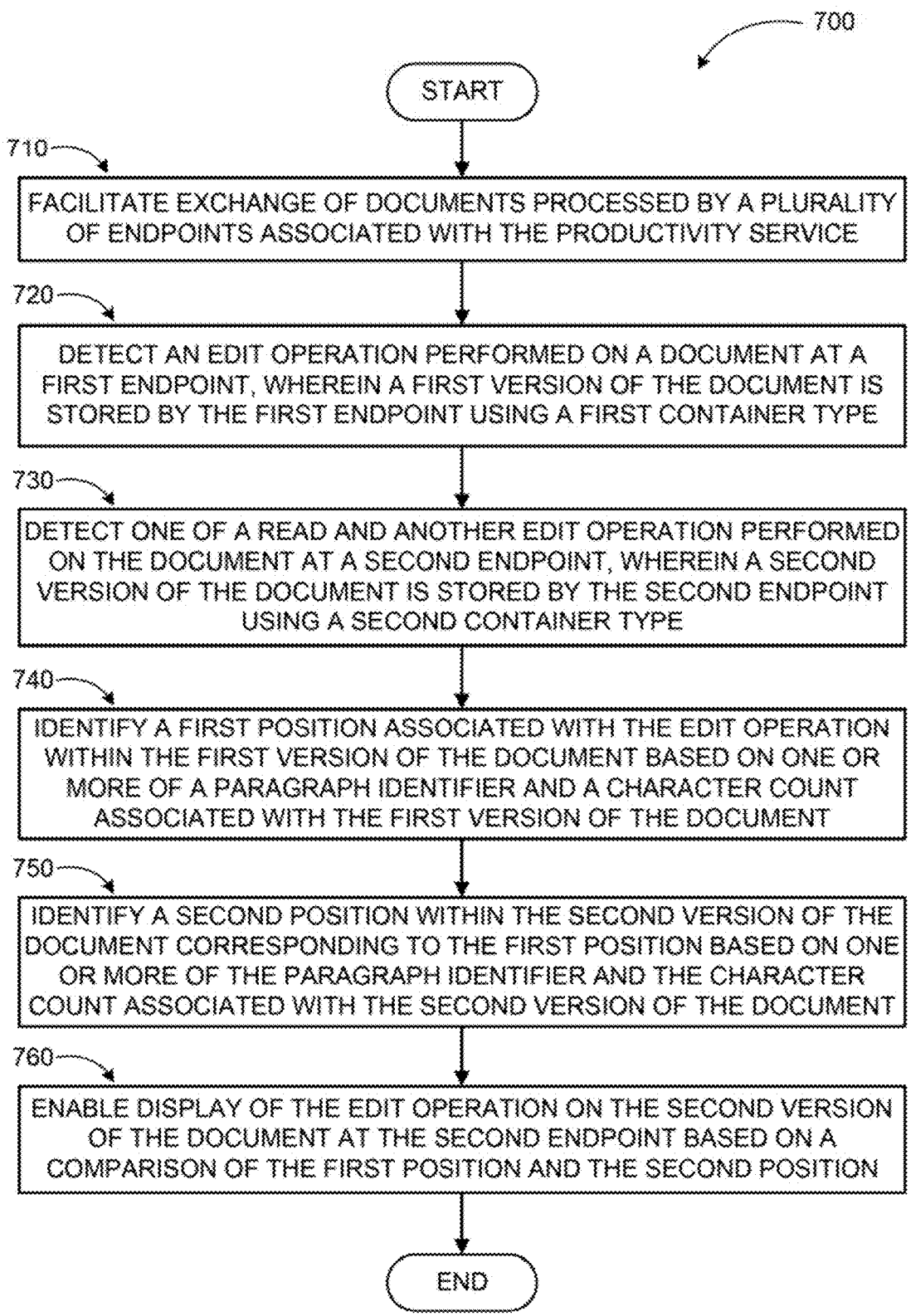
FIG. 7 is a logic flow diagram illustrating a process to provide transfer content between documents of different storage types, according to embodiments.

FIG. 7 is a logic flow diagram illustrating a process to provide transfer of content, between documents of different storage types, according to embodiments. Process 700 may be implemented on a computing device such as the computing device 600 or other system.

Process 700 begins with operation 710, where exchange of documents processed by a plurality of endpoints associated with the productivity service may be facilitated. At operation 720, an edit operation may be detected as performed on a document at a first endpoint. A first version of the document is stored by the first endpoint using a first container type. The container type may include a file format. At operation 730, a read or another edit operation may be detected as performed on the document at a second endpoint. A second version of the document may be stored by the second endpoint using a second container type. The second container type may include another file format that may differ from the container type of the first version of the document.

At operation 740, a first position associated with the edit operation may be identified within the first version of the document based on a paragraph identifier and/or a character count associated with the first version of the document. At operation 750, a second position may be identified within the second version of the document corresponding to the first position based on the paragraph identifier and a character count associated with the second version of the document. At operation 760, display of the edit operation may be enabled on the second version of the document at the second endpoint based on a comparison of the first position and the second position.

The operations included in process 700 are for illustration purposes. Providing transfer of content between documents of different storage types may be implemented by similar processes with fewer or additional steps, as well as in different order of operations using the principles described herein.

According to some examples, a computing device to provide transfer of content between documents of different storage types may be described. The computing device may include a memory configured to store instructions associated with a productivity service, one or more processors coupled to the memory and the display device. The one or more processors may execute the productivity service in conjunction with the instructions stored in the memory. The productivity service may include a communication module. The communication module may be configured to facilitate exchange of documents processed by a plurality of endpoints associated with the productivity service. The productivity service may also include a conversion module. The conversion module may be configured to detect an edit operation performed on a document at a first endpoint, where a first version of the document is stored by the first endpoint using a first container type, detect a read or another edit operation performed on the document at a second endpoint, where a second version of the document is stored by the second endpoint using a second container type, identify a first position associated with the edit operation within the first version of the document based on one or more of a paragraph identifier and a character count associated with the first version of the document, identify a second position within the second version of the document corresponding to the first position based on one or more of the paragraph identifier and the character count associated with the second version of the document, and enable display of the edit operation on the second version of the document at the second endpoint based on a comparison of the first position and the second position.

According to other examples, the conversion module is further configured to detect the other edit operation performed on the document at the second endpoint, identify a third position associated with the other edit operation within the second version of the document based on one or more of the paragraph identifier and the character count associated with the second version of the document, identify a fourth position corresponding within the first version of the document corresponding to the third position based on one or more of the paragraph identifier and the character count associated with the first version of the document, and enable display of the other edit operation on the first version of the document at the first endpoint based on a comparison of the third position and the fourth position.

According to further examples, the conversion module is further configured to transmit the edit operation and the first position to the second endpoint to prompt the second endpoint to execute the edit operation attire second position on the second version of the document and transmit the paragraph identifier and the character count associated with the first version of the document as the first position to the second endpoint, where the second position is identified based on an offset of the first position using the paragraph identifier and the character count associated with the second version of the document.

According to other examples, the conversion module is further configured to detect a cursor placement operation performed on the first version of the document at the first endpoint, count a number of characters between a start of a paragraph and a third position of the cursor placement operation to compute the character count associated with the first version of the document, and transmit an identifier of the paragraph of the cursor placement operation and the character count to the second endpoint to prompt the second endpoint to perform the cursor placement operation on the second version at another position that matches the third position.

According to further examples, the conversion module is further configured to receive a notification from the second endpoint, where the notification indicates a lack of the paragraph identifier associated with the second version of the document that corresponds to the paragraph identifier in the first version of the document, a rendering module configured to render the document through the first and the second endpoints, and where the conversion module is further configured to provide an alert that describes a conflict between the first version of the document and the second version of the document to the rendering module to prompt the rendering module to display the alert through the first and the second endpoints, and execute one or more conflict resolution rules to resolve the conflict between the first version of the document and the second version of the document.

According to other examples, the conversion module is further configured to identify the edit operation as applied to a text block of a paragraph within the first version of the document, where the text block includes one or more invisible characters, count a number of the one or more invisible characters as an invisible character count, and transmit the edit operation, the paragraph identifier of the paragraph within the first version of the document, the character count, and the invisible character count to the second endpoint to prompt the second endpoint to apply the edit operation on the second position in the second version of the document, where the second position is identified based on an offset of the character count and the invisible character count from a start of another paragraph within the second version of the document corresponding to the paragraph within the first version of the document.

According to further examples, the first and the second endpoints are a word processing application, a presentation application, a note taking application, or a spreadsheet application executed on a desktop computer, a handheld computer, a mobile computer, a wearable computer, or a server accessed through a terminal.

According to some examples, a method for providing transfer of content between documents of different storage types may be described. The method may include facilitating exchange of documents processed by a plurality of endpoints associated with a productivity service; enabling display of a first version of a document stored in a first file type through a first endpoint and a second version of the document stored in a second file type through a second endpoint, where the first and the second endpoints are different versions of a productivity application within the productivity service executed on distinct computing devices, detecting a first operation applied to a first paragraph within the first version of the document, computing a character count of an offset between a start of the first paragraph and a first position of the first operation, and transmitting the first operation, an identifier of the first paragraph, and the character count to the second endpoint to prompt the second endpoint to apply the first operation to a second position in a second paragraph of the second version of the document, where the second position and the second paragraph correspond to the first position and the first paragraph in the first version of the document.

According to other examples, the method may further include identifying the first operation as an insertion operation, an edit operation, or a deletion operation applied on a first text block of the first paragraph, where the first text block includes one or more of: one or more characters, one or more words, and one or more sentences, detecting a length of the first text block, and transmitting the length of the first text block to the second endpoint to prompt the second endpoint to confirm the length of the first text block as identical to a length of a second text block in the second paragraph of the second version of the document. The method may further include in response to a determination that the length of the first text block is different from the length of the second text block, displaying a conflict alert through the first and the second endpoints.

The method may further include identifying a first formatting type used to create the first text block, identifying a second formatting type used to create the second text block, where one or both of the first text block and the second text block include one or more invisible characters, query the second productivity application to identify the second formatting type used to create the second text block of the second paragraph of the document that includes one or more invisible characters, where the second text block includes a hyperlink, identifying a variance between the first formatting type used to create the first text block and the second formatting type used to create the second text block and adjusting the character count associated with the first text block based on the variance to prompt the second endpoint to apply the first operation at the second position, where the second position includes an offset of the character count associated with the first text block from a start of the second paragraph.

According to some examples, a computer-readable memory device with instructions stored thereon for providing transfer of content between documents of different storage types may be described. The instructions may include actions that are similar to the method described above.

According to some examples, a means for providing transfer of content between documents of different storage types may be described. The means for providing transfer of content between documents of different storage types may include a means to facilitate exchange of documents processed by a plurality of endpoints associated with the productivity service, a means to detect an edit operation performed on a document at a first endpoint, where a first version of the document is stored by the first endpoint using a first container type, a means to detect a read or another edit operation performed on the document at a second endpoint, where a second version of the document is stored by the second endpoint using a second container type, a means to identify a first position associated with the edit operation within the first version of the document based on one or more of a paragraph identifier and a character count associated with the first version of the document, a means to identify a second position within the second version of the document corresponding to the first position based on one or more of the paragraph identifier and the character count associated with the second version of the document, and a means to enable display of the edit operation on the second version of the document at the second endpoint based on a comparison of the first position and the second position.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method comprising:
   enabling display of a first version of a document stored in a first file type through a first endpoint, the document having a corresponding second version of the document stored in a second file type by a second endpoint, wherein the first and the second endpoints comprise different versions of a productivity application and are executed on distinct computing devices;
   detecting a first operation applied to a first paragraph within the first version of the document;
   computing a character count of an offset between a start of the first paragraph and a first position of the first operation;
   after detecting the first operation applied to the first paragraph, processing content of the first paragraph to derive a conflict detection value usable by the second endpoint to detect a paragraph conflict; and
   transmitting the first operation, an identifier of the first paragraph, the conflict detection value, and the character count to the second endpoint to prompt the second endpoint to apply the first operation to a second position in a second paragraph of the second version of the document subject to conflict detection using the conflict detection value, wherein the second position and the second paragraph correspond to the first position and the first paragraph in the first version of the document.

2. The method of claim 1, further comprising:
   identifying the first operation as one of: an insertion operation, an edit operation, and a deletion operation applied on a first text block of the first paragraph, wherein the first text block includes one or more of: one or more characters, one or more words, and one or more sentences.

3. The method of claim 2, further comprising:
- detecting a length of the first text block as the conflict detection value; and
- transmitting the length of the first text block to the second endpoint to prompt the second endpoint to confirm the length of the first text block as identical to a length of a second text block in the second paragraph of the second version of the document.

4. The method of claim 3, further comprising:
- in response to a determination that the length of the first text block is different from the length of the second text block, providing a conflict alert through the first and the second endpoints.

5. The method of claim 3, further comprising:
- identifying a first formatting type used to create the first text block;
- identifying a second formatting type used to create the second text block, wherein one or both of the first text block and the second text block include one or more invisible characters; and
- querying the second endpoint to identify the second formatting type used to create the second text block of the second paragraph of the document, wherein the second text block includes a hyperlink.

6. The method of claim 5, further comprising:
- identifying a variance between the first formatting type used to create the first text block and the second formatting type used to create the second text block; and
- adjusting the character count based on the variance to prompt the second endpoint to apply the first operation at the second position, wherein the second position includes an offset of the character count associated with the first text block from a start of the second paragraph.

7. A computer-readable memory device with instructions stored thereon which, when executed on a computing device, cause actions to be performed, the actions comprising:
- facilitating exchange of documents processed by a plurality of endpoints associated with a productivity service;
- enabling display of a first version of a document stored in a first file type through a first endpoint and a second version of the document stored in a second file type through a second endpoint, wherein the first and the second endpoints are different versions of a productivity application executed on distinct computing devices;
- detecting a first operation applied to a first paragraph within the first version of the document;
- computing a character count, associated with the first version of the document, of an offset between a start of the first paragraph and a first position of the first operation;
- identifying a second position within the second version of the document corresponding to the first position based on one or more of a paragraph identifier of the first paragraph and a character count associated with the second version of the document; and
- applying the first operation to the second position in a second paragraph of the second version of the document,
- wherein the actions further comprise:
  - identifying the first operation as one of: an insertion operation, an edit operation, and a deletion operation applied on a first text block of the first paragraph, wherein the first text block includes one or more of: one or more characters, one or more words, and one or more sentences;
  - detecting a length of the first text block; and
  - transmitting the length of the first text block to the second endpoint to prompt the second endpoint to identify a second text block within the second version of the document corresponding to the first text block.

8. The computer-readable memory device of claim 7, wherein the actions further comprise:
- detecting a second operation performed on the document as a second edit operation at the second endpoint;
- identifying a third position associated with the second edit operation within the second version of the document based on one or more of the paragraph identifier and the character count associated with the second version of the document;
- identifying a fourth position within the first version of the document corresponding to the third position based on one or more of the paragraph identifier and the character count associated with the first version of the document; and
- enabling display of the second edit operation on the first version of the document at the first endpoint based on a comparison of the third position and the fourth position.

9. The computer-readable memory device of claim 7, wherein the actions further comprise:
- transmitting the first operation and the first position to the second endpoint to prompt the second endpoint to execute the first operation at the second position on the second version of the document.

10. The computer-readable memory device of claim 9, wherein the actions further comprise:
- transmitting the paragraph identifier and the character count associated with the first version of the document as the first position to the second endpoint, wherein the second position is identified based on an offset of the first position using the paragraph identifier and the character count associated with the second version of the document.

11. The computer-readable memory device of claim 7, wherein the document is a word processing document and the productivity application is a word processing application.

12. The computer-readable memory device of claim 7, wherein the document is a spreadsheet document and the productivity application is a spreadsheet application.

13. The computer-readable memory device of claim 7, wherein the productivity application is a presentation application.

14. The computer-readable memory device of claim 7, the actions further comprising:
- detecting invisible characters associated with the first operation; and
- transmitting an invisible character count of the invisible characters to the second endpoint.

15. A computer-implemented method comprising:
- facilitating exchange of documents processed by a plurality of endpoints associated with a productivity service;
- enabling display of a first version of a document stored in a first file type through a first endpoint and a second version of the document stored in a second file type through a second endpoint, wherein the first and the second endpoints are different versions of a productivity application executed on distinct computing devices;

detecting a first insertion, edit, or deletion operation applied to a first text block of a first paragraph within the first version of the document, wherein the first text block includes one or more of: one or more characters, one or more words, and one or more sentences;

computing a character count of an offset between a start of the first paragraph and a first position of the first insertion, edit, or deletion operation;

transmitting the first insertion, edit, or deletion operation, an identifier of the first paragraph, and the character count to the second endpoint to prompt the second endpoint to apply the first insertion, edit, or deletion operation to a second position in a second paragraph of the second version of the document, wherein the second position and the second paragraph correspond to the first position and the first paragraph in the first version of the document;

detecting a length of the first text block; and transmitting the length of the first text block to the second endpoint to prompt the second endpoint to confirm the length of the first text block as identical to a length of a second text block in the second paragraph of the second version of the document.

16. The method of claim 15, wherein the document is a word processing document and the productivity application is a word processing application.

17. The method of claim 15, wherein the document is a spreadsheet document and the productivity application is a spreadsheet application.

18. The method of claim 15, wherein the productivity application is a presentation application.

19. The method of claim 15, further comprising:

detecting invisible characters associated with the first insertion, edit, or deletion operation; and transmitting an invisible character count of the invisible characters to the second endpoint.

20. The method of claim 15, performed by the productivity service in communication with the first endpoint and the second endpoint over a computer network.

* * * * *